United States Patent
Echensperger

(10) Patent No.: US 8,195,185 B2
(45) Date of Patent: Jun. 5, 2012

(54) METHOD FOR RADIO CARRIER SELECTION IN RADIO TRANSMISSION SYSTEMS

(75) Inventor: Heimo Echensperger, Geretsried (DE)

(73) Assignee: T-Mobile International AG, Bonn (DE)

( * ) Notice: Subject to any disclaimer, the term of this patent is extended or adjusted under 35 U.S.C. 154(b) by 518 days.

(21) Appl. No.: 12/306,930

(22) PCT Filed: Jun. 19, 2007

(86) PCT No.: PCT/EP2007/005363
§ 371 (c)(1),
(2), (4) Date: Aug. 24, 2009

(87) PCT Pub. No.: WO2008/000368
PCT Pub. Date: Jan. 3, 2008

(65) Prior Publication Data
US 2010/0069021 A1     Mar. 18, 2010

(30) Foreign Application Priority Data
Jun. 28, 2006  (DE) .......................... 10 2006 029 878

(51) Int. Cl.
*H04W 72/00* (2009.01)
(52) U.S. Cl. .................. 455/452.2; 455/67.13; 455/419; 455/456.3; 370/329
(58) Field of Classification Search ............... 455/452.2, 455/67.11, 67.13, 115.1, 500, 440, 403, 419, 455/441, 437, 456.3; 370/329, 349
See application file for complete search history.

(56) References Cited

U.S. PATENT DOCUMENTS

| 5,396,647 | A | 3/1995 | Thompson | |
|---|---|---|---|---|
| 6,125,278 | A * | 9/2000 | Wieczorek et al. | 455/437 |
| 6,674,733 | B1 * | 1/2004 | Huusko | 370/329 |
| 6,778,522 | B1 * | 8/2004 | Rossi et al. | 370/349 |
| 2003/0003922 | A1 | 1/2003 | McClure | |
| 2004/0053630 | A1 | 3/2004 | Ramos | |
| 2005/0163047 | A1 * | 7/2005 | McGregor et al. | 370/229 |

FOREIGN PATENT DOCUMENTS

| EP | 1448007 B1 | 4/2006 |
|---|---|---|
| EP | 1566070 B1 | 4/2006 |
| WO | 0007384 A | 2/2000 |
| WO | 0119108 A | 3/2001 |

OTHER PUBLICATIONS

Office Action from China Patent Office mailed on Nov. 9, 2010, in corresponding Chinese application No. 2010022400943550.
IPRP translation for International application No. PCT/EP2007/005363 dated Jun. 19, 2007.
Office Action cited by the German patent office in application No. 10 2006 029 878.0 on Apr. 8, 2008.

* cited by examiner

*Primary Examiner* — Shaima Q Aminzay
(74) *Attorney, Agent, or Firm* — Browdy and Neimark, PLLC

(57) ABSTRACT

A method and an apparatus for selection of a radio carrier from a number of available radio carriers in radio transmission systems are provided. The respective best radio carrier is selected in a mobile unit as a function of the location of the mobile unit, with the selection being made on the basis of the information currently determined by and already available in the mobile unit, relating to the quality of the available radio carriers.

14 Claims, 4 Drawing Sheets

Early use

METHOD FOR RADIO CARRIER SELECTION IN RADIO TRANSMISSION SYSTEMS

FIELD

The invention relates to the field of the radio or wireless networks that transmit signals in order to transmit information to and from mobile objects, and in particular to a method for radio bearer selection in radio transmission systems.

BACKROUND

A mobile object, e.g. a train, a boat, a truck, etc., as a rule, follows a predefined course on the respective traffic routes, e.g. on railroad tracks, a river, a road, etc. These traffic routes are usually supplied with radio signals by one or a plurality of radio transmission systems. This means that along the courses of these traffic routes, one or a plurality of radio bearers are established that can be used to transmit information from and to a mobile send/receive unit, in the following also called a mobile unit, located on the mobile object. For an optimal performance and quality of the information transmission it is necessary for the mobile unit to select, at each location along the traveled route, the best radio bearer—either a single one or a plurality of them in combination—in accordance with special application requirements so as to obtain the highest quality with regard to the application being executed.

FIG. 1, by way of example, shows the radio coverage and quality of a plurality of radio bearers A, B, C, along a given route. The quality of the radio bearers is shown schematically in steps from 0 to 7. The assumption is made that a mobile object is moving along this route. The mobile object has a mobile unit that is set up for communication via the radio bearers A, B and C. Even though the bearers A and B are available most of the time, bearer A would initially be the first choice for a radio transmission, as it is available for a major part of the route and provides the best quality. "Quality" in the context of this document is an abstract value relating to the suitability of the respective bearer with respect to the requirements posed by the application, and can be derived from one or more parameters of the bearer. Quality in this context also includes the bearer selection priority, since always the bearer with the highest quality is selected. In the gap, i.e. the section of lacking availability of the bearer A, approximately in the middle of the diagram, the mobile unit would select the bearer B, since only it is active here and can guarantee the radio coverage. Further to the left, bearer C is active as well for a short period of time and provides a higher quality than bearer A, so that in this section of the route, bearer C would be selected.

To permit an expedient selection of the bearer, the radio bearers are received by the mobile unit by means of corresponding send/receive units (SRUs), e.g. modems. The SRUs provide information relating to the quality of the radio channel on the basis of measured quality parameters, which may include:
signal strength,
signal/noise ratio,
available bandwidth
etc.

One problem in selecting the best bearer is that the current measured values of the SRUs do not contain any information relating to the future signal quality that can be expected if one continues to move along the route. Consequently, the inaccurate reception or non-reception of a bearer might lead to unsuitable or inaccurate decisions in the selection of the best bearer, since the quality of the bearer may drop below a useable level for a short period of time, or also the opposite may be the case. Inaccurate, in this context, can also include that the mobile unit moves too fast to be able to make meaningful use of a bearer because of the short dwelling time of the mobile unit in the coverage area of a bearer in this case.

Patent Disclosure WO 01/19108 A1 discloses a method for selection of a radio bearer from a number of available radio bearers in radio transmission systems wherein a selection of the respective best radio bearer is performed by a mobile unit as a function of the location of the mobile unit. The selection may be performed on the basis of information currently determined by the mobile unit and already existing information relating to the quality of the available radio bearers.

Similar methods are disclosed in Patent Disclosures U.S. Pat. No. 5,396,647 A, WO 00/07384 A1, and US 2003/003922 A1.

It is, therefore, the object of the invention to provide, for mobile objects that move along a route, a method for bearer selection between one or a plurality of bearers from a multitude of available radio bearers that delivers the best results in terms of the quality requirements placed on the signal transmission.

This object is met according to the invention by a method for selection of a radio bearer from a number of available radio bearers in radio transmission systems, in which, by a mobile unit, a selection of the respective best radio bearer is made as a function of the location of the mobile unit, with the selection being performed on the basis of information relating to the quality of the available radio bearers currently determined by the mobile unit and already existing information relating to the quality of the available radio bearers, wherein, in the mobile unit, as a function of its direction of movement and speed, a prediction relating to the expected quality of the radio bearers at a geographical position to be passed and/or at a specified point in time is prepared, and on the basis of this prediction the selection of the radio bearers takes place, wherein errors in a radio transmission system are detected on the basis of a comparison of the information currently determined by the mobile unit relating to the quality of the available radio bearers with the existing information relating to the quality of the available data bearers, and that these errors are reported to the operator of the defective radio transmission system.

Preferred embodiments and additional advantageous characteristics of the invention are specified in the dependent claims, whose disclosure is hereby directly referenced.

In the context of this invention the selection of a bearer is synonymous with the selection of one or a plurality of bearers (multiplexing) for which the same quality results of the selection process apply.

The invention proceeds from the assumption that a mobile unit follows a predefined course along a traffic route, e.g. like a train. The route is known to the mobile unit in advance, or it is repeatedly passed through by the mobile unit. In accordance with the invention, already existing information relating to the availability and quality of each radio bearer along the route is used to make a decision for the selection of the best bearer and to optimize the procedure of a switching (handover) between different bearers. Information relating to the availability and quality of each radio bearer along the route can be determined and stored by the mobile unit itself during previous travels along this route and used during future travels along this route. However, the information can also be made available to the mobile unit by third parties. The quality information relating to a radio bearer that may be a selection criterion for the bearer to be used could be: data throughput, transmission delay, continuity, bit error rate (BER), and parity error rate (PER).

In addition to the above specified parameters, an analysis of the data flow (e.g. full state monitoring) or special measuring packets to an assigned server with predictable response times may be used to improve the information relating to the expected quality of a bearer.

SUMMARY

The information relating to the quality of each bearer along a route is stored in a database of the mobile unit, arranged by geographical positions or distances (time) from the start or destination position. During each travel, the information that is stored in this database is compared with the currently measured quality values of the particular bearer by the mobile unit. The already stored information is corrected if an established discrepancy between the stored and the currently measured values is exceeded, in order to continuously update the database to a potentially changing bearer quality along the route, e.g. if base stations of the radio transmission system are added or removed, or if the signal propagation conditions change.

As the mobile unit is moving along the route it compares not only the currently measured values of the bearer quality to the corresponding values in the database, but it can retrieve from the database already in advance the expected bearer quality for the route ahead. This means that the mobile unit, according to the invention, can select an alternate bearer even before the bearer that is currently being used drops below a predefined threshold value for the bearer quality. If a better bearer is expected, the mobile unit can gather from the database whether the radio network coverage of this bearer will be of sufficient duration relative to the current speed of the mobile unit to make the selection of this bearer meaningful. This makes it possible to prevent a premature and inaccurate switching of the bearer. The term "radio network coverage" in this context means the availability of a bearer signal on a level that permits a reliable transmission of data over the radio interface.

BRIEF DISCRITPTION OF THE DRAWINGS

One exemplary embodiment of the invention will be described below in conjunction with the drawings.

Figure 6:
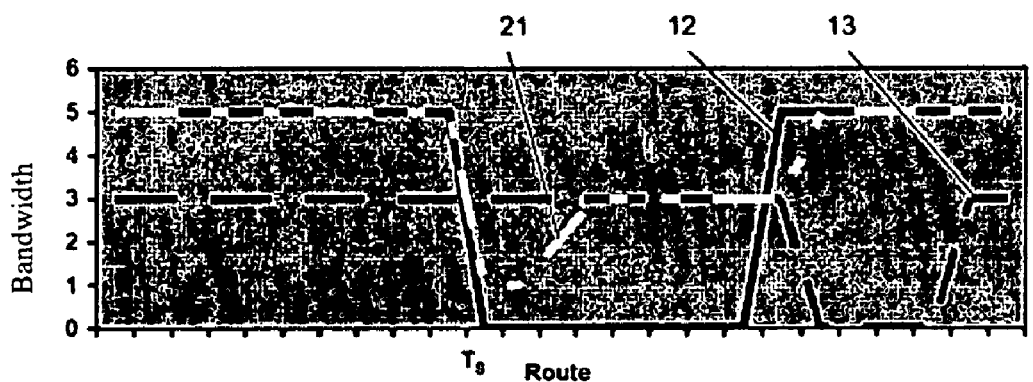

In [sic] FIG. 6 shows the available bandwidth for the payload without an early use of the bearer.

Figure 7:
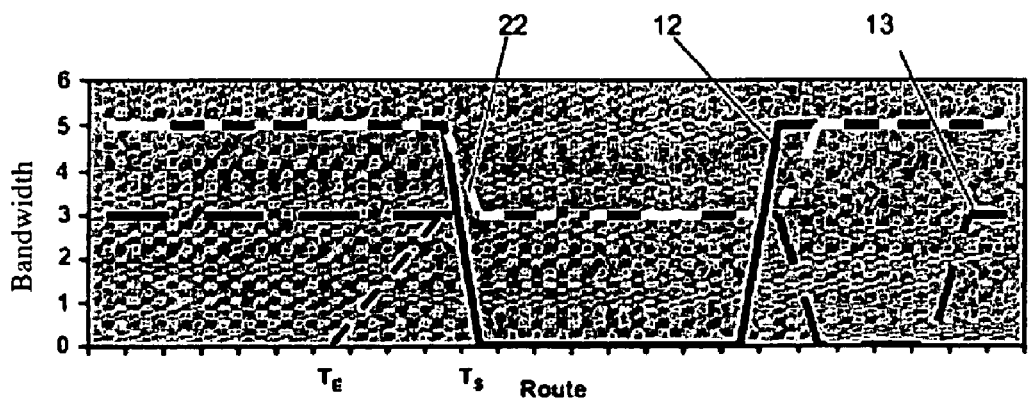

In FIG. 7 an early use of the bearer B is shown, wherein the bearer B is activated earlier, at a point in time $T_E$.

Figure 4:
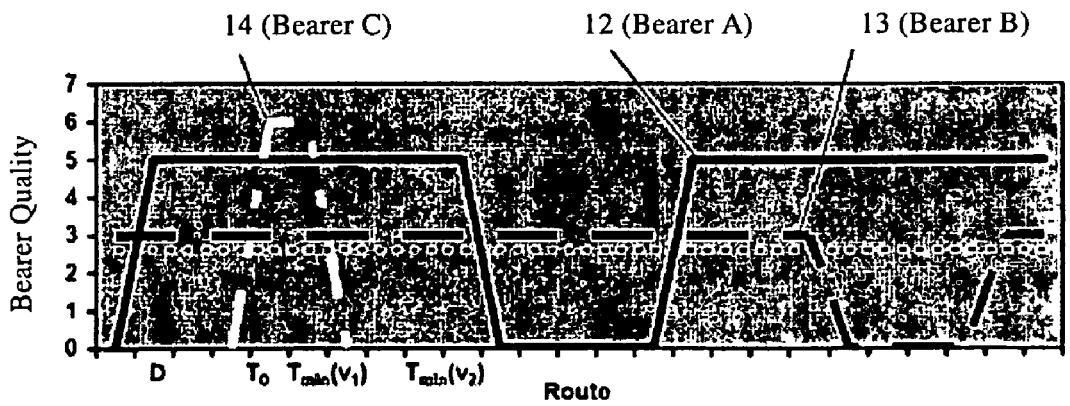
FIG. 4 shows an example for determining the minimum availability of a bearer.
Figure 8:
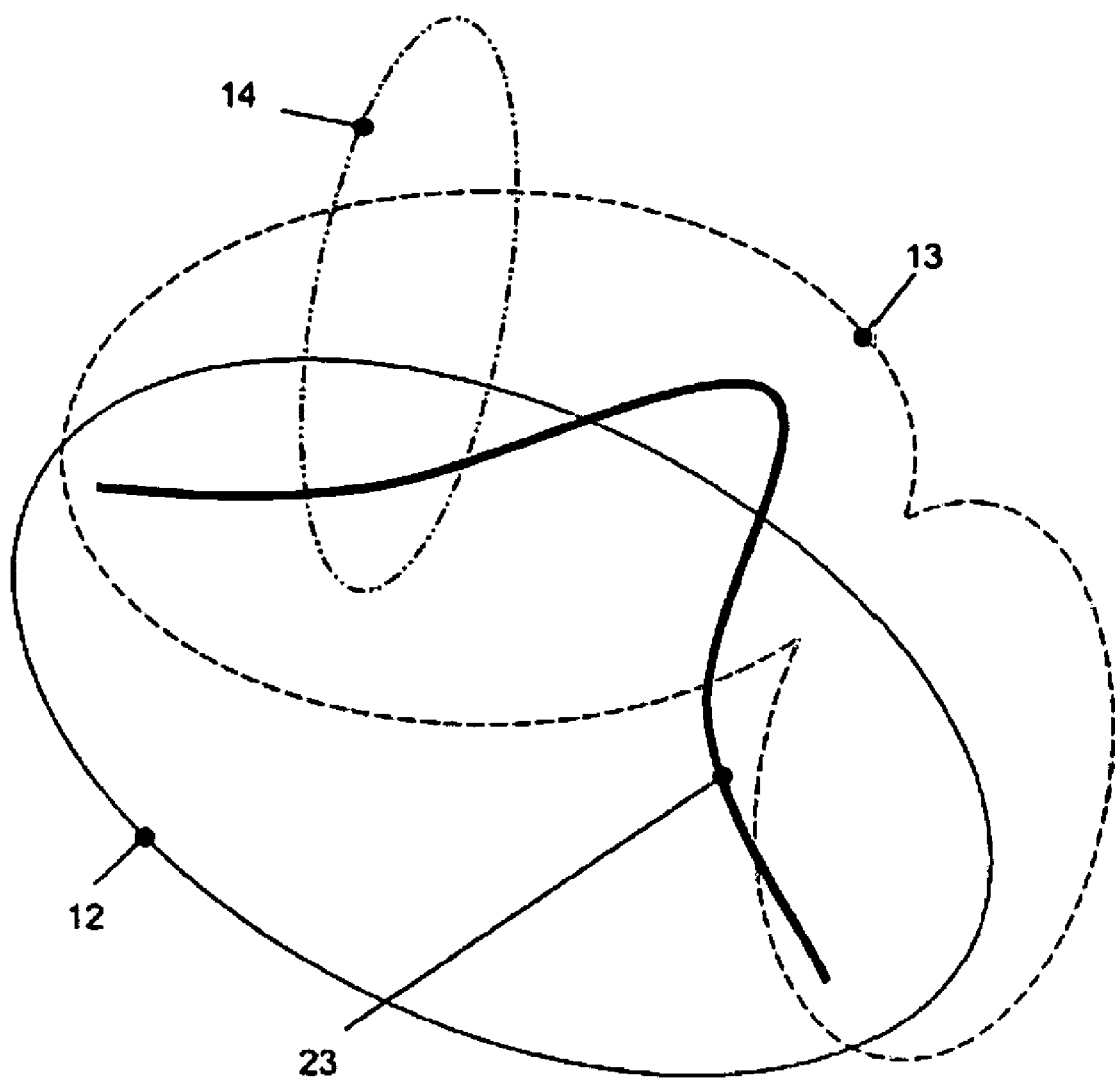

FIG. 8 shows the course of a route and the coverage of the route with different radio bearers as per FIG. 4, in the form of a map.

DETAILED DESCRITPTIOM

Figure 1:
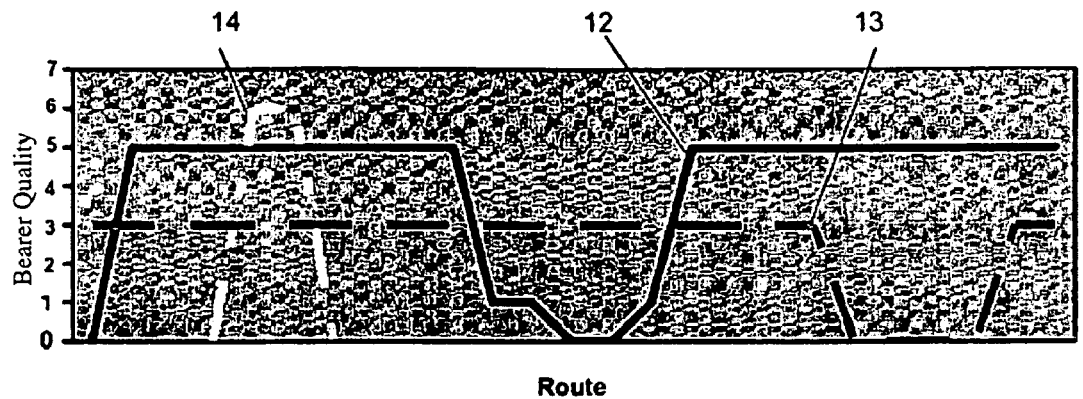
FIG. 1 shows, by way of an example, the radio network coverage and quality of a plurality of radio bearers A, B, C, along a given route.
Figure 2:
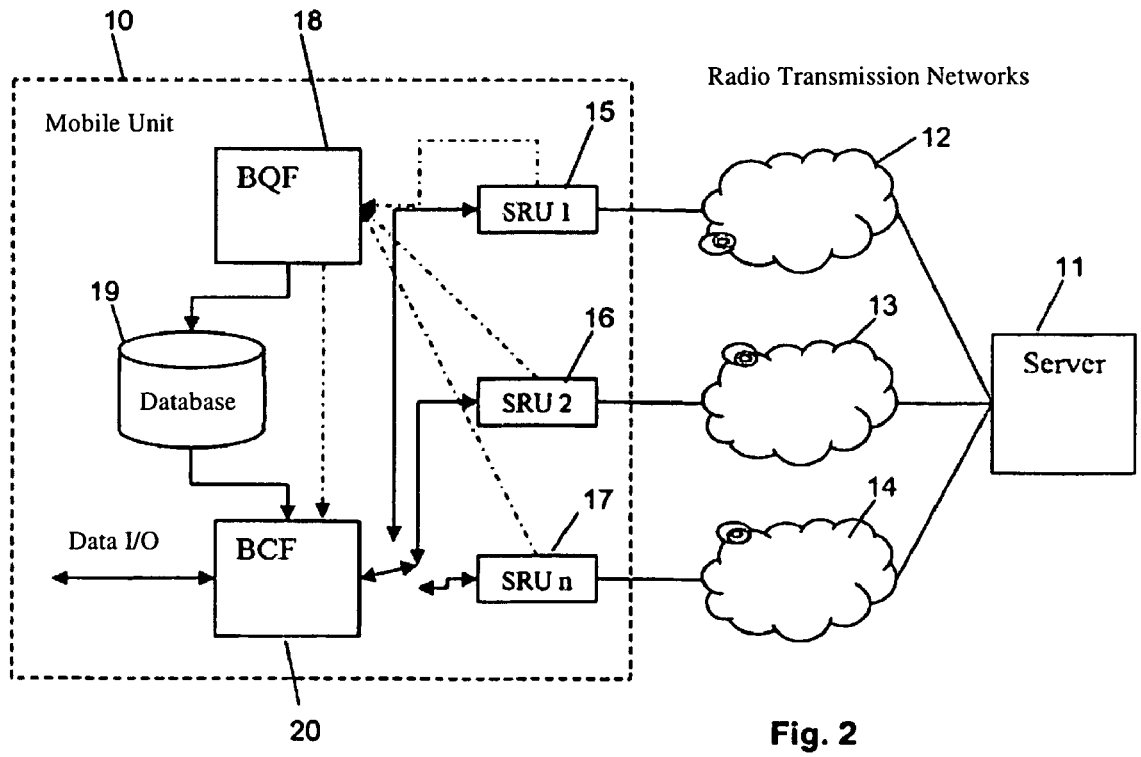
FIG. 2 represents the logic structure of a system according to the invention.

FIG. 2 shows the logic structure of a system according to the invention. A mobile unit 10 that moves, for example, along a route 23 (FIG. 8) contains a data source/sink (not shown) that communicates with a server system 11 via one or a plurality of radio transmission systems 12, 13, 14. Additionally, the mobile unit 10 contains a number of send/receive units (SRUs) 15, 16, 17, each of which serves one radio bearer of a mobile radio transmission system. The SRUs 15, 16, 17, continuously measure the quality of their assigned radio bearer by means of suitable parameters, like data throughput, transmission delay, continuity, bit error rate, parity error rate, etc. A bearer quality function (BQF) 18 that is provided in the mobile unit reads the quality parameters of the received bearers 12-14 from the SRUs and calculates from these for each radio bearer a corresponding bearer quality. If the mobile unit 10 moves along a route 23 a matching number of bearer qualities is determined for a number of geographical positions along this route 23 and stored in a database 19. The bearer qualities along the route may be acquired for example at equidistant positions, or also in certain time intervals.

If the mobile unit now once again moves along the same route 23, a bearer control function (BCF) 20 that is provided in the mobile unit 10 reads out from the database 19 the bearer qualities that were previously determined for this route and compares them with the current measured values of the SRUs 15-17. Based on the current measured values of the bearer qualities and the empirical measured values stored in the database 19, the bearer control function 20 can make a corresponding decision for the selection of the best bearer.

FIG. 2 does not contain any physical implementation of the invention. The units BQF 18, BCF 20, and SRU 15-17 may be implemented as a single or plurality of physical basic modules within the mobile unit 10 as may be expedient.

Statistical Course of the Radio Coverage

The BQF 18 determines a statistical course of the radio network coverage (SCH), i.e. the signal quality of each bearer from a prior travel along route 23 is acquired, stored and maintained. In the process, the BQF 18 takes into account, during each travel of the mobile unit along a "known" route 23, the current measured values of the bearer qualities and does this by using an individual weighting factor for each bearer, so as to update the changes in the bearer qualities for this route.

Establishing the Statistical Course of the Radio Coverage

During the first travel along a route 23, the BQF 18 continuously acquires in predefined time intervals $T_i$, the current position $P_k$ of the mobile unit 10 and reads from the SRUs the current bearer qualities belonging to these positions $P_k$. This yields a list with position data and bearer qualities having a mutual distance $D(T_i)$. The time intervals $T_i$ are selected such that sufficient information in relation to the speed v of the mobile unit and to the cell size of a radio bearer can be acquired so that a correct selection of the best bearer can subsequently be made. This may also include taking into account the time $T_{switch}$ to switch back and forth between the bearers. The interval can accordingly be derived from $T_i=f(1/v)$.

The list with position data and bearer qualities is stored in a manner so that it can effectively be used forward or in reverse, depending on the direction of travel of the mobile unit along the route 23. For each position value a current value of the quality level $L_n(P_k)$ of each available bearer $B_n$ is stored as a starting value. Accordingly there exists for each bearer $B_n$ at each position $P_k$ a corresponding value of $L_{n,k}$ in the database that forms the statistical acquisition history.

It is recommended that a position list $P_k$ with $D(T_i)$=const.=$D(t=D/v)$ be established, as the radio signals fluctuate with the distance. Alternatively, a position list with $D(T_i$=const.) can be established. In this case one obtains bearer quality values at different distances as a function of the speed of the mobile unit 10.

Establishing the Quality Levels of the Bearers

The values of the quality level $L_n(P_k)$ are computed on the basis of the measured values of the signal quality $Q_{n,m}$, e.g. SNR, that a respective SRU 15-17 makes available for its bearer. The computation of $L_n(P_k)$ from the different values $Q_{n,m}$ is then standardized, e.g. by means of weighting functions, so that the values $L_{n,k}$ of one bearer can be compared in terms of the requirements placed on the information transmission (e.g. available bit error rate, bandwidth) directly to the $L_{n,k}$ of another bearer.

Updating the Statistical Course of the Radio Network Coverage

Figure 3:
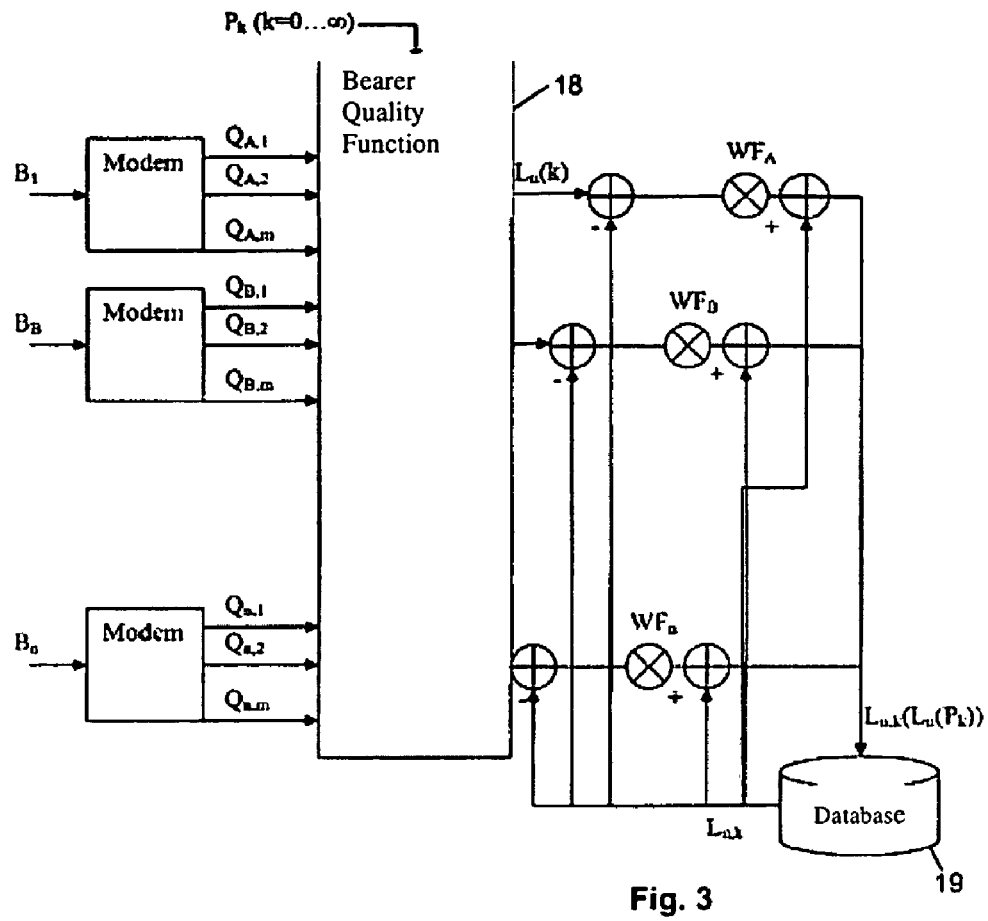
FIG. 3 shows the mode of operation of an update of the database of the bearer histories.

FIG. 3 shows the mode of operation of an update of the database of the bearer qualities. During repeated travels along a route 23, the bearer quality is established for each bearer at each position $P_k$ as previously described. The difference between the resulting current quality level $L_n(P_k)$ and the quality level $L_{n,k}$ stored at this position is multiplied with a weighting function $WF_n$ and added to the stored quality level $L_{n,k}$ which yields a new mean quality level $L_{n,k}$ that is stored in the database.

$$L_{n,k}(L_n(P_k))=WF_n(L_n(P_k)-Ln_k)$$ [Equation 1]

The weighting function $WF_n$ establishes how fast changes in the quality of the bearer flow into the acquisition history, which also depends on whether a linear or a non-linear function is selected (FIG. 3).

Bearer Selection on the Basis of the History of the Bearer Qualities

During the movement of the mobile unit along the route 23, the BCF 18 reads-in, in an "appropriate" interval $T_i$ or at certain positions $P_k$, the different quality parameters $Q_{n,m}$ of all bearers $B_n$ from the SRUs 15-17. With this information the current quality level $L_n(P_k)$ of each bearer is computed as previously described. Based on $L_n(P_k)$ and on the subsequent considerations, the best bearer to be used can be selected.

Minimum Availability of the Bearer (Start of the Radio Network Coverage)

In order to maintain the required quality of the information transmission, a switch to a bearer with a higher priority which, however, is available only for a short period of time, can be prevented.

Within this scope, the minimum duration can be defined for which a bearer must be available in order for information to be transmitted via the same. This incorporates into the selection process the element of the speed of the mobile unit, since the length of time for which a bearer is available depends in particular on the speed with which the mobile unit passes through the region of the radio coverage of the bearer.

In order to prevent an unnecessary switching back and forth between different bearers, for example if a bearer with a higher priority has been detected that, however, is available only for a short period of time, the BCF 18 can examine the expected bearer quality for a time $T_{min}$ in advance. $T_{min}$ defines the time that is required to switch to the higher-priority bearer and at the end of its radio coverage back to the previous bearer, plus the length of time that the bearer needs to be available for transmission of information. $T_{min}$ thus defines the minimum length of time that a bearer must be available in order to be considered in the selection process. Because of the dependence of $T_{min}$ on the speed of the mobile unit, and under the precondition that the bearer quality levels exist at the same distances in the database, the BCF 18 must look ahead by a number of x, with $$x=vT_{min}/D$$ [Equation 2]

entries in the database and read out from the database the expected quality level of the bearer. If the expected quality level for the entry x is still above the threshold value, the BCF is to switch to the new bearer; if the anticipated quality level of the entry x is below the threshold value, the BCF is to remain with the current bearer.

FIG. 4 shows an example for the determination of the minimum bearer availability. The mobile unit is currently using a bearer A. At the point in time $T_0$ a different bearer C with a better quality than bearer A is detected by the mobile unit. The bearer C has a higher priority, due to its higher quality level, than the bearer A that is currently being used if both are above a certain threshold value. The BCF 20 will access the database 19 and, starting from the point in time $T_0$, look ahead by a number of x entries, in order to be able to make a prediction for the future radio coverage of the bearer C. If, at a current speed $v_1$ of the mobile unit 10 the quality of the bearer C at the point in time $T_{min}(v_1)$ is still above the threshold value, the BCF 20 is to switch from bearer A to bearer C. If, at a speed $v_2$ of the mobile unit 10 at the point in time $T_{min}(V_2)$ no radio coverage by the bearer C exists, the BCF 20 is to remain with the current bearer A.

End of the Prediction of the Radio Coverage

Figure 5:
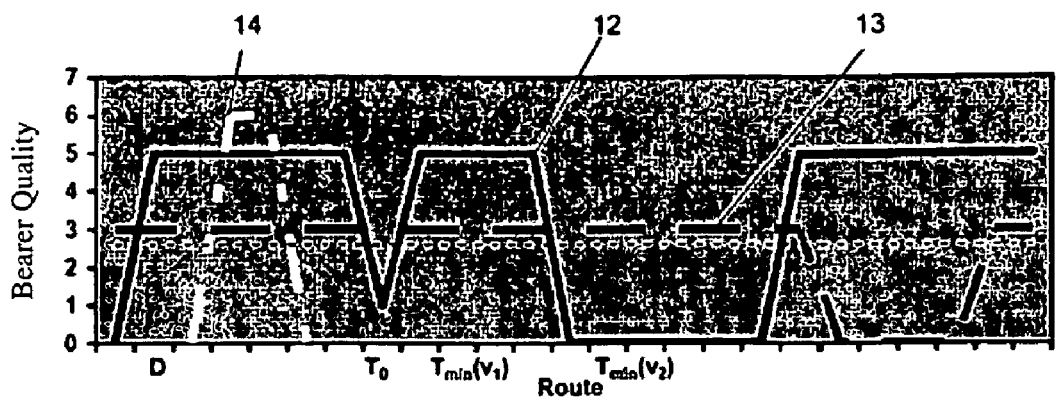
FIG. 5 shows, by way of example, the end of the prediction of the radio coverage.

A similar problem of an inaccurate selection arises when short signal drop-outs occur in a bearer. In this case, the goal is to prevent that the BCF 20 switches to a different bearer with a potentially lower priority, since the bearer that has been used up to then will shortly be available again. Such a scenario is depicted in FIG. 5. At the point in time $T_0$ the bearer A for some reason has a brief signal drop-out. As it was described above, the equation 2 can be used to look ahead in the database 19 when it can be expected that a bearer will become completely unavailable, like for example at the point in time $T_{min}(v_2)$, or will shortly be available again, like for example at the point in time $(T_{min}(v_1)$, which depends on the current speed at which the mobile unit 10 moves.

Verification of the Radio Coverage

Both at the beginning and at the end of a radio coverage prediction the expected data from the database 19 must be synchronized with the current measured values of the bearer qualities. If there is a significant discrepancy, e.g. because of an error in a base station, an immediate decision regarding the selection of the best bearer must be made on the basis of the current measured values. To achieve this, the number of differing values and the associated threshold values of $L_n(P_k)$ relative to $L_{n,k}$ must be defined as a function of the speed of the mobile unit 10.

This verification of the radio coverage also makes it possible to detect errors that cannot easily be detected without a SCH. Certain errors in the radio elements, both in the mobile unit and in the base stations of the radio transmission systems, cannot be distinguished from the case in which a radio signal simply is not available because the transmitter has ceased to function, for example because of a defective antenna cable. Because of the SCH, one knows whether a base station exists at a certain position. If the expected measured values of a bearer are not received, an alarm can be issued to trigger a check of the system either by the base station or by the mobile station.

Early Use of Bearers

Certain radio bearers provide a mobile subscriber with a bandwidth that depends on the payload generated by this subscriber, e.g. UMTS or HSPDA. With UMTS, a so-called ramp-up function exists that allocates the more bandwidth to a subscriber the more data the subscriber transmits or receives.

With the data that is available in the SCH, the determination can be made as to when a switch to a bearer with such a ramp-up function takes place. In anticipation of this switch the BCF 20 can begin with an early use of a bearer in such a way that it generates dummy data on the bearer with a ramp-up function, in order to be allocated the bandwidth before the payload is switched to this bearer.

In FIG. 6 the available bandwidth 21 for the payload is depicted without such an early use of the new bearer. At a point in time $T_s$ a switch is made from bearer A to the bearer B. On the bearer B an initial (low) bandwidth is made available and increased in accordance with the demand only after the payload has been switched to the bearer B.

FIG. 7 shows an early use of the bearer B, that is the bearer B is already activated at a point in time $T_E$. The activation causes the bearer B to allocate to the subscriber the available bandwidth 22 already prior to switching on the payload, at the point in time TS, which then, when the actual switch of the payload is performed at the point in time $T_s$, results in an optimized and overall balanced allocation of the available bandwidth.

FIG. 8 schematically shows a geographical course of a route 23 and the coverage of the route 23 with radio signals of multiple bearers 12 through 14. The corresponding bearer qualities are depicted in FIG. 4.

LIST OF REFERENCE SYMBOLS

10 mobile unit
11 server
12 radio transmission system A, bearer A
13 radio transmission system B, bearer B
14 radio transmission system C, bearer C
15 send/receive unit
16 send/receive unit
17 send/receive unit
18 bearer quality function
19 database
20 bearer control function
21 bandwidth
22 bandwidth
23 route

What is claimed is:

1. A method for selection of a radio bearer from a plurality of available radio bearers in radio transmission systems, in which, by a mobile unit, a selection of a best radio bearer of the plurality of available radio bearers is made as a function of location of the mobile unit, with the selection being performed based on information relating to quality of the plurality of available radio bearers currently determined by the mobile unit and already existing information relating to the quality of the plurality of available radio bearers, further comprising, in the mobile unit,
preparing a prediction, as a function of direction of movement and speed of the mobile unit, relating to expected quality of the radio bearers at at least one of a geographical position to be passed based on a specified point in time is prepared,
selecting one of the plurality of available radio bearers based on the prepared prediction, for use by the mobile unit.

2. The method according to claim 1, wherein the quality of the plurality of available radio bearers is determined based on at least one of the following parameters: data throughput, transmission delay, continuity of the availability, bit error rate, and parity error rate.

3. The method according to claim 1, wherein the existing information relating to the quality of the plurality of available radio bearers was previously acquired and stored by the mobile unit.

4. The method according to claim 1, wherein the existing information relating to the quality of the plurality of available radio bearers was made available to the mobile unit by third parties.

5. The method according to claim 1, wherein the existing information relating to the quality of the plurality of available radio bearers is stored as a function of geographical position data.

6. The method according to claim 1, wherein the existing information relating to the quality of the plurality of available radio bearers is stored as a function of time information.

7. The method according to claim 1, wherein the information currently determined by the mobile unit relating to the quality of the plurality of available radio bearers is compared with the existing information relating to the quality of the plurality of available radio bearers, and the existing information is updated if needed.

8. The method according to claim 1, wherein switching to the selected one of the plurality of available radio bearers takes place only if said selected one of the plurality of available radio bearers is expected to be available for a specified minimum duration of usage.

9. The method according to claim 1, wherein switching from a radio bearer that is currently being used to the selected radio bearer takes place only if the radio bearer that is currently being used is expected to no longer be available for a specified duration of unavailability.

10. The method according to claim 1, wherein prior to a switch from a radio bearer that is currently being used to another radio bearer within the plurality of radio bearers with dynamic bandwidth allocation, an early activation of the another radio bearer takes place, to guarantee an allocation of a maximum bandwidth.

11. A system for selection of a radio bearer from a plurality of available radio bearers in radio transmission systems, incorporating a mobile unit having means for selection of a best radio bearer as a function of at least one of location of the mobile unit and point in time of presence of the mobile unit at the location, comprising:

means for current determination of quality of the plurality of available radio bearers,
means that contain stored measured values of an empirical course of the quality of the plurality of available radio bearers,
means, provided in the mobile unit that, as a function of direction of movement and speed of the mobile unit, prepare a prediction relating to expected quality of the plurality of available radio bearers at at least one of a geographical position to be passed and at a specified point in time, and based on the prepared prediction, select one of the plurality of available radio bearer for use by the mobile unit.

12. The system according to claim 11, wherein the mobile unit includes means for determining the geographical position.

13. The method according to claim 1, further comprising:
detecting errors in a radio transmission system based a comparison of information currently determined by the mobile unit relating to the quality of the plurality of available radio bearers with existing information relating to the quality of the plurality of available data bearers, and reporting said errors to an operator of said radio transmission system.

14. The system according to claim 11, further comprising means for detecting errors in a radio transmission system based on a comparison of information currently determined by the mobile unit relating to the quality of the plurality of available radio bearers, with existing information relating to the quality of the plurality of available radio bearers, and reporting said errors to an operator of the radio transmission system.

* * * * *